(12) United States Patent
Yoshida et al.

(10) Patent No.: US 7,385,618 B2
(45) Date of Patent: Jun. 10, 2008

(54) IMAGE FORMING METHOD AND IMAGE FORMING APPARATUS

(75) Inventors: Naoki Yoshida, Tokyo (JP); Hiroyuki Kasahara, Tokyo (JP)

(73) Assignee: WEDG Co., Ltd., Tokyo (JP)

( * ) Notice: Subject to any disclaimer, the term of this patent is extended or adjusted under 35 U.S.C. 154(b) by 303 days.

(21) Appl. No.: 11/241,948

(22) Filed: Oct. 4, 2005

(65) Prior Publication Data

US 2006/0119696 A1 Jun. 8, 2006

(30) Foreign Application Priority Data

Dec. 3, 2004 (JP) ............................. 2004-351438

(51) Int. Cl.
*B41J 2/52* (2006.01)
(52) U.S. Cl. .................. 347/184; 400/120.07
(58) Field of Classification Search ........ 347/183–184; 400/120.07
See application file for complete search history.

(56) References Cited

U.S. PATENT DOCUMENTS

| 4,679,055 A | 7/1987 | Inui et al. |
| 4,701,811 A | 10/1987 | Moriguchi et al. |
| 4,774,528 A | 9/1988 | Kato |
| 4,819,008 A | 4/1989 | Nagato et al. |
| 6,356,360 B1 * | 3/2002 | Rushing et al. ............... 358/1.9 |
| 6,975,431 B1 * | 12/2005 | Sugizaki ..................... 358/3.06 |

FOREIGN PATENT DOCUMENTS

| EP | 0 304 289 A3 | 2/1989 |
| EP | 0 903 931 A1 | 3/1999 |

* cited by examiner

*Primary Examiner*—Huan H Tran
(74) *Attorney, Agent, or Firm*—Bacon & Thomas, PLLC

(57) ABSTRACT

An image with sufficient gray-scale representation and high resolution is formed on a medium to be recorded, such as an intermediate transfer body, using a thermal printer employing thermal transfer ink. When thermal transfer ink of a thermal transfer ink ribbon 18 is thermally transferred onto an intermediate transfer body 12 by a thermal head 14, gray-scale values of pixels of a filter image having a threshold value pattern used to determine whether each of a plurality of pixels of an original image is an object to be printed, based on gray-scale values of the pixels, are compared with the gray-scale values of the pixels of the original image, and then the gray-scale values of the pixels of the original image are converted based on the result of the comparison. A gray-scale conversion table in which energy applied to the pixels at the time of printing is prescribed corresponding to the gray-scale values of the pixels is compared with the converted gray-scale values of the pixels of the original image, and the converted gray-scale values of the pixels of the original image are further converted on the basis of the result of the comparison. In addition, the application of a current to the thermal head 14 is controlled according to the converted gray-scale values of the pixels of the original image.

6 Claims, 8 Drawing Sheets

IMAGE FORMING METHOD AND IMAGE FORMING APPARATUS

BACKGROUND OF THE INVENTION

1. Field of the Invention

The present invention relates to an image forming method and an image forming apparatus, and more particularly, to an image forming method that forms images by thermally transferring, for example, ink of a thermal transfer ink ribbon onto a medium to be recorded and then by recording the images by transferring the images onto the medium using heat and pressure, and to an image forming apparatus.

2. Description of the Related Art

Conventionally, in representing a multi-gradation using a color material, such as a thermal transfer ink ribbon or an ordinary thermal paper, on which only two gray-scale values per unit pixel can be represented in a thermal printer for forming images by controlling the intensity of a current passing through a thermal head, the images with the multi-gradation are obtained through a halftoning process, such as a dither method or an error diffusion method. However, the dither method has a disadvantage in that a dither matrix becomes large and the resolution becomes lowered as the number of gray-scale values to be desired increases. In addition, the error diffusion method has been used for a line thermal printer (see Japanese Unexamined Patent Application Publication No. 2002-86786). However, the error diffusion method is not common for a thermal printer has a great effect of accumulated heat on a thermal head.

In addition, there has been proposed a method of representing a multi-gradation by controlling an area per dot recorded on a recording medium, using a print system including an ink ribbon having an adjusted application thickness of ink, a recording medium having a substrate and a porous-surface layer formed on the substrate, the porous-surface layer having a specific range in size, a thermal head provided with a plurality of heating resistors formed in a line at regular intervals, temperature gradient of each of the heated heating resistors being such that temperature is the highest at a middle portion thereof and becomes lower toward ends thereof, and a gray-scale control circuit for controlling ink fusion areas heated by the heating resistors by controlling the intensity of a current passing through the thermal head (see Japanese Patent No. 2850930 and Japanese Unexamined Patent Application Publication No. 2000-85171) This method enables multi-gradation images with higher resolution and higher quality as compared to the dither method. However, the method has a restricted application to only a special porous recording medium.

On the other hand, a method of forming images on a variety of recording media by first forming the images on an intermediate transfer medium having an image receiving layer and an adhesive layer and then by transferring the images on a recording medium using heat and pressure has already been put to a practical use (see Japanese Unexamined Patent Application Publication No. 2002-79765) According to this method, there is no effect on the intermediate transfer medium even if the recording medium is changed. Also, since this method may consider only transferability of the images onto the recording medium, it allows formation of the images on various kinds of recording media as compared to a direct printing method. In addition, in this method, since a heat roller made of soft heat-resistant rubber is used to transfer the image onto the recording medium, it is possible to form the images on a recording medium having more or less unevenness.

In addition, there has been proposed a melt type color thermal transfer recording method in which a thermal head having a plurality of heating elements arranged therein in a main scanning direction is used, a recording paper moves relative to the thermal head at least in a sub-scanning direction vertical to the main scanning direction, driving of each of the heating elements is controlled during the relative movement, the length of ink dots in the-sub scanning direction changes depending on the density of pixels to be recorded, and a halftone color image is recorded on the recording paper by cyan, magenta, and yellow ink dots, wherein at least cyan and magenta are so arranged as to be different in their densities of pixels in the sub-scanning direction (see Japanese Patent No. 2577115 and Japanese Unexamined Patent Application Publication No. 5-116356). This method can prevent the variation of the color tone of images and the occurrence of pattern moirs due to any deviation of color registration in the sub scanning direction.

However, the porous-surface layer is required to be formed on a surface of the recording medium in order to form the images by the dot area gradation. On the other hand, in the method of forming the images using the intermediate transfer medium, the porous-surface layer is not formed since an intermediate transfer layer to be transferred must be transparent and smooth. Accordingly, in the method of forming the images using the intermediate transfer medium, the images must be formed using a sublimation thermal transfer method that can represent gradation for each dot or the dither method or the error diffusion method using the thermal transfer ink ribbon, or must be formed on the smooth intermediate transfer layer by unstable and variable narrow dot area gradation. In addition, in this method, when the dot gradation is recorded on the intermediate transfer medium having no porous-surface layer, dots are formed with weak printing energy when forming images at low density. Accordingly, it is difficult to form the dots reliably, unstable spots may occur in the images, and images having granularity may occur. Moreover, since the images are apt to be affected by deviation of characteristics of the thermal head, irregularity of sensitivity of the intermediate transfer medium, environments, such as ambient temperature, it is difficult to achieve high-quality images.

The sublimation thermal transfer method can obtain a smooth gradation characteristic and allows images to be formed with high precision since this method does not require an area gradation by a dot modulation. However, since dye-based ink is used in this method, a problem may occur in the durability of the dye due to mismatch with the recording medium, thus requiring to choose a proper recording medium.

In addition, in the method in which at least cyan and magenta are arranged so as to be different in their densities of pixels in the sub-scanning direction, since the density of images is represented by varying the length of dots, the number of gray-scale values is too small to record images of photographic quality, and accordingly, it is difficult to achieve high-quality images.

Accordingly, it is an object of the present invention to form images on a medium to be recorded with sufficient gradation representation and high resolution using thermal transfer ink.

SUMMARY OF THE INVENTION

To achieve the above object, according to an aspect of the invention, there is provided a method of forming an image by thermally transferring thermal transfer ink of a thermal transfer ink ribbon onto a medium to be recorded by a thermal head. The method includes comparing gray-scale values of pixels of a filter image having a threshold value pattern used to determine whether each of a plurality of pixels of an original image is an object to be printed, based on gray-scale values of the plurality of pixels, with the gray-scale values of the pixels of the original image to convert the gray-scale values of the pixels of the original image on the basis of the result of the comparison; comparing a gray-scale conversion table in which energy applied to each pixel at the time of printing is prescribed corresponding to the gray-scale value of the pixel with the converted gray-scale values of the pixels of the original image to further convert the gray-scale values of the pixels of the original image on the basis of the result of the comparison; and controlling the application of a current to the thermal head according to the converted gray-scale values of the pixels of the original image.

According to this image forming method, a dot area gradation can be realized by supplying to thermal head energy corresponding to the gray-scale value of the original image to at least one pixel within the threshold value pattern. That is, by combining an image having an area modulated by a combined pattern of dots of pixels and an image having some of dots constituting the pattern modulated in their area, a dot area-modulated image can be realized, and a multi-gradation representation at an ordinary observation can be realized, which makes it possible to form multi-gradation images with high resolution and high quality.

In addition, according to another aspect of the invention, there is provided a method of forming an image by thermally transferring thermal transfer ink of a thermal transfer ink ribbon onto a medium to be recorded by a thermal head. The method includes dividing an original image into patterns each composed of a plurality of pixels; comparing gray-scale values of the pixels of the divided patterns with a gray-scale conversion table in which energy applied to the pixels of each pattern at the time of printing is set to be different and converting a gray-scale of the pixels of each pattern, corresponding to the gray-scale values of the pixels, to convert the gray-scale values of the pixels of each pattern on the basis of the result of the comparison; and controlling the application of a current to the thermal head based on the converted gray-scale values of pixels of the original image.

According to this image forming method, since the original image is divided into patterns each composed of a plurality of pixels and image conversion is performed, using different gray-scale conversion tables, for different elements of each pattern, an image by an area gradation of the pattern can be combined with an image by an area gradation of each dot, which makes it possible to form multi-gradation images with high resolution and high quality.

In addition, the present invention can be applied to an image forming method used for a thermal printer including an image forming device that forms images by thermally transferring thermal transfer ink of a thermal transfer ink ribbon onto a medium to be recorded by a thermal head. The image forming device performs the following steps:

(1) comparing gray-scale values of pixels of a filter image having a threshold value pattern used to determine whether each of a plurality of pixels of an original image is an object to be printed, based on gray-scale values of the plurality of pixels, with the gray-scale values of the pixels of the original image to convert the gray-scale values of the pixels of the original image on the basis of the result of the comparison; comparing a gray-scale conversion table in which energy applied to the pixels at the time of printing is prescribed corresponding to the gray-scale values of the pixels with the converted gray-scale values of the pixels of the original image to further convert the gray-scale values of the pixels of the converted original image on the basis of the result of the comparison; and controlling the application of a current to the thermal head according to the converted gray-scale values of the pixels of the converted original image.

(2) dividing an original image into patterns each composed of a plurality of pixels; comparing gray-scale values of the pixels of the divided patterns with a gray-scale conversion table in which energy applied to the pixels of each pattern at the time of printing is set to be different corresponding to the gray-scale values of the pixel to convert the gray-scale values of the pixels of each pattern on the basis of the result of the comparison; and controlling the application of a current to the thermal head based on the converted gray-scale values of pixels of the original image.

In addition, according to still another aspect of the invention, there is provided an image forming apparatus that thermally transfers thermal transfer ink of a thermal transfer ink ribbon onto a medium to be recorded by a thermal head. The image forming apparatus includes an image processing unit that compares gray-scale values of pixels of a filter image having a threshold value pattern used to determine whether each of a plurality of pixels of an original image is an object to be printed, based on gray-scale values of the plurality of pixels, with the gray-scale values of the pixels of the original image to convert the gray-scale values of the pixels of the original image on the basis of the result of the comparison; a gray-scale converting unit that compares a gray-scale conversion table in which energy applied to each pixel at the time of printing is prescribed corresponding to the gray-scale value of the pixel with the gray-scale values of the pixels of the original image converted by the image processing unit to further convert the gray-scale values of the pixels of the converted original image on the basis of the result of the comparison; and a current application control unit that controls the application of a current to the thermal head according to the gray-scale values of the pixels of the original image converted by the gray-scale converting unit.

Further, according to yet another aspect of the invention, there is provided an image forming apparatus that thermally transfers thermal transfer ink of a thermal transfer ink ribbon onto a medium to be recorded by a thermal head. The image forming apparatus includes a dividing unit that divides an original image into patterns each composed of a plurality of pixels; a gray-scale converting unit that compares gray-scale values of the pixels of the patterns divided by the dividing unit with a gray-scale conversion table in which energy applied to the pixels of each pattern at the time of printing is set to be different, corresponding to the gray-scale value of the pixels, to convert the gray-scale values of the pixels of each pattern on the basis of the result of the comparison; and a current application control unit that controls the application of a current to the thermal head based on the gray-scale values of the pixels of the original image converted by the gray-scale converting unit.

In addition, in the method of forming an image by thermally transferring thermal transfer ink of a thermal transfer ink ribbon onto a medium to be recorded by a thermal head, the method including comparing gray-scale values of pixels of a filter image having a threshold value pattern used to determine whether each of a plurality of pixels of an original image is an object to be printed, based on gray-scale values of the plurality of pixels, with the gray-scale values of the pixels of the original image to convert the gray-scale values of the pixels of the original image on the basis of the result of the comparison; comparing a gray-scale conversion table in which energy applied to each pixel at the time of printing is prescribed corresponding to the gray-scale value of the pixel with the converted gray-scale values of the pixels of the original image to further convert the gray-scale values of the pixels of the converted original image on the basis of the result of the comparison; and controlling the application of a current to the thermal head according to the converted gray-scale values of the pixels of the converted original image, it is preferable that, when color separation in each color is performed on the original image, a feed resolution of the separated original image be converted, and that feed resolutions of each color be different from each other.

According to this image forming method, a dot area gradation can be realized by supplying energy corresponding to the gray-scale values of the original image to at least one pixel within the threshold value pattern to thermal head. That is, by combining an image having an area modulated by a combined pattern of dots of pixels and an image having some of dots constituting the pattern modulated in their area, a dot area-modulated image can be realized, and a multi-gradation representation at an ordinary observation can be realized, which makes it possible to form multi-gradation images with high resolution and high quality. In addition, by varying the feed resolution of at least magenta and cyan in each color, it is possible to disperse a change in color sense due to slight deviation of dots for each color within a small range and to suppress the overall variation of the color sense.

Further, in the method of forming an image by thermally transferring thermal transfer ink of a thermal transfer ink ribbon onto a medium to be recorded by a thermal head, the method including dividing an original image into patterns each composed of a plurality of pixels; comparing gray-scale values of the pixels of the divided patterns with a gray-scale conversion table in which energy applied to the pixels of each pattern at the time of printing is set to be different, corresponding to the gray-scale values of the pixels, to convert the gray-scale values of the pixels of each pattern on the basis of the result of the comparison; and controlling the application of a current to the thermal head based on the converted gray-scale values of pixels of the original image, it is preferable that, when color separation is performed on the original image, a feed resolution of the separated original image be converted, and that feed resolutions of at least magenta and cyan in each color be different from each other.

According to this image forming method, since the original image is divided into patterns each composed of a plurality of pixels and image conversion is performed, using different gray-scale conversion tables, for each elements of each pattern, an image by an area gradation of the pattern can be combined with an image by an area gradation of each dot, which makes it possible to form multi-gradation images with high resolution and high quality. In addition, by varying the feed resolutions of at least magenta and cyan, it is possible to disperse a change in color sense due to slight deviation of dots for each color within a small range, and to suppress the overall variation of the color sense.

Furthermore, according to still yet another aspect of the invention, a computer-readable program allows a computer to execute the steps of the image forming device, and a recording medium has the computer-readable program recorded thereon.

DESCRIPTION OF THE PREFERRED EMBODIMENTS

Hereinafter, preferred embodiments of the invention will be described with reference to the accompanying drawings. In the following description, RGB refers to red, green, and blue, and CMYK refers to cyan, magenta, yellow, and black. Also, each color level is represented by integers between 0 and 255. In addition, an intermediate transfer body is used as a medium to be recorded in the following embodiments of the invention, but the principle of the present invention can be similarly applied to other media to be recorded.

First Embodiment

Figure 1:
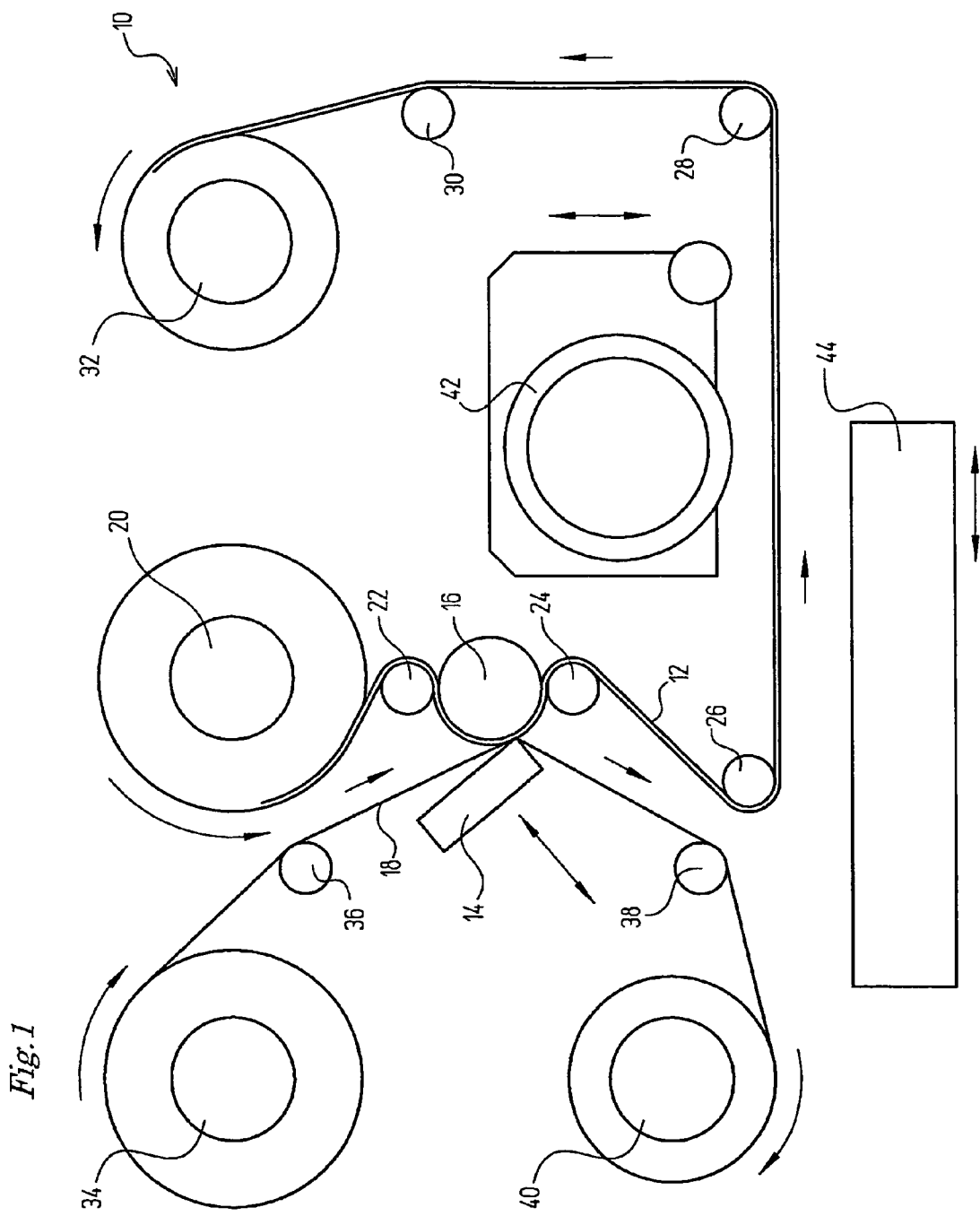
FIG. 1 is a block diagram illustrating main portions of a thermal printer according to a first embodiment of the present invention.
Figure 2:
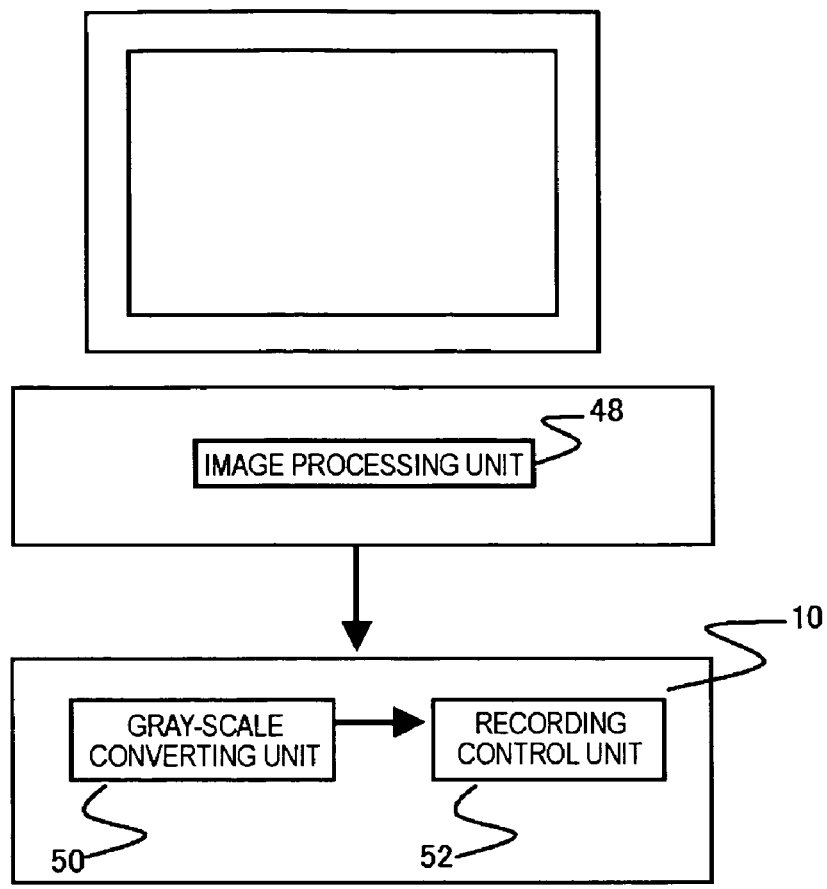
FIG. 2 is a block diagram illustrating an image forming apparatus according to the first embodiment of the present invention.

FIG. 1 is a block diagram illustrating main portions of a thermal printer, and FIG. 2 is a block diagram illustrating an image forming apparatus.

In FIG. 1, a thermal printer 10 includes a thermal head 14 serving as a thermal recording unit when images are formed on an intermediate transfer body 12. The thermal head 14 is arranged opposite to a platen roller 16. The thermal head 14 is arranged on the platen roller 16 via a thermal transfer ink ribbon 18 and the intermediate transfer body 12 in such a manner that the thermal head 14 can be advanced/retreated to/from the platen roller 16. The intermediate transfer body 12 is fed between the platen roller 16 and the thermal head 14 via a feed roller 22 by rotation of a supply roller 20, and is then wound on a winding roller 32 via feed rollers 24, 26, 28, and 30. The thermal transfer ink ribbon 18 is fed between the platen roller 16 and the thermal head 14 via a feed roller 36 by rotation of a supply core 34, and is then wound on a winding core 40 via a feed roller 38. A heat roller 42 is arranged between the feed roller 26 and the feed roller 28 in such a manner that the heat roller 42 can be contacted/separated to/from the intermediate transfer body 12. A recording medium 44 is arranged in a reciprocating manner opposite to the heat roller 42 with the intermediate transfer body 12 disposed therebetween.

When the intermediate transfer body 12 and the thermal transfer ink ribbon 18 are fed between the platen roller 16 and the thermal head 14, thermal-fusible ink of the thermal transfer ink ribbon 18 is thermally transferred onto a receiving layer of the intermediate transfer body 12 by applying a current to the thermal head 14, thereby forming an image on the intermediate transfer body 12. When the intermediate transfer body 12 having the image formed thereon is fed between the feed roller 26 and the feed roller 28, the intermediate transfer body 12 is heated while being pressed against and contacted with the recording medium 44 by the heat roller 42 during the movement between the feed roller 26 and the feed roller 28, thereby recording an image on the recording medium 44.

That is, the thermal printer 10 functions as an image forming unit for forming an image by thermally transferring the fusible thermal transfer ink of the thermal transfer ink ribbon 18 onto the intermediate transfer body 12 by the thermal head 14 and an image recording unit for transferring the image formed on the intermediate transfer body 12 onto the recording medium 44. In the thermal printer 10, the recording of images is performed for each color.

An image forming apparatus 46 for recording an image on the recording medium 44 includes an image processing unit 48, a gray-scale converting unit 50, and a recording control unit 52 as components of the thermal printer 10, as shown in FIG. 2.

The image processing unit 48 is configured as an image processing means for comparing gray-scale values of pixels of a filter image having a threshold value pattern used to determine whether each of a plurality of pixels of an original image is an object to be printed, based on the gray-scale values of the plurality of pixels, with gray-scale values of pixels of the original image, and for converting the gray-scale values of the pixels of the original image on the basis of the result of the comparison. The gray-scale converting unit 50 is configured as a gray-scale converting means for comparing a gray-scale conversion table in which energy when each pixel is printed is specified according to the gray-scale value of the pixel with the gray-scale values of the pixels of the original image converted by the image processing means, and for converting the gray-scale value of the pixels of the original image converted by the image processing unit 48. The recording control unit 52 is configured as a current application control means for controlling the application of a current to the thermal head 14 according to the gray-scale values of the pixels of the original image converted by a gray-scale converting means.

More specifically, for example, the image processing unit 48 uses two threshold value patterns for defining threshold values for an image process at the size of two pixels by two pixel to eight pixels by eight pixels as the threshold value pattern used to determine whether each of the plurality of pixels of the original image is an object to be printed, based on the gray-scale values of the plurality of pixels, and processes the original image on basis of two filter images produced by arranging the two threshold value patterns according to the size of the original image.

Figure 3:
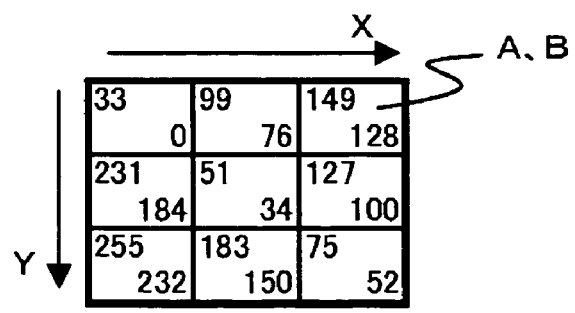
FIG. 3 is a diagram illustrating patterns A and B according to the first embodiment of the present invention.

FIG. 3 is a diagram illustrating an example of a threshold value patterns A and B of three pixels by three pixels. Hereinafter, assuming that a pixel at the upper left side of the threshold value patterns A and B is an origin (0, 0)p, a horizontal direction is an X-axis, and a vertical direction is a Y-axis, coordinates of the threshold value patterns A and B are denoted by (X, Y)p. Similarly, assuming that a pixel at the upper left side of each of the original and filter images is an origin (0, 0)i, a horizontal direction is an x-axis, and a vertical direction is a y-axis, coordinates of each image is denoted by (x, y)i.

In addition, a numerical value indicated at the upper left side of each element of the threshold value patterns A and B shown in FIG. 3 is a value of the threshold value pattern A, showing an upper limit value (gray-scale value) defining the range of the threshold value. Also, a numerical value indicated at the lower right side of each element of the threshold value patterns A and B is a value of the threshold value pattern B, showing a lower limit value (gray-scale value) defining the range of the threshold value. For example, in FIG. 3, a value of the threshold value pattern A at coordinates (0, 0)p is 33, and a value of the threshold value pattern B at coordinates (0, 0)p is 0. FIG. 3 shows an example of a threshold value pattern for any of colors of a CMYK image.

The threshold value patterns A and B may use a different size and value for each color. Also, the number of pixels in the horizontal direction may not be equal to the number of pixels in the vertical direction. However, depending on a setting, since undesired patterns may regularly occur in the image and thus an insufficient gray-scale value may be obtained, it is necessary to experimentally set the size and value of the threshold value patterns A and B. For example, when this embodiment is applied to a thermal printer having a resolution of 400 dpi, printing with high quality is possible even in a four pixel-by-four pixel threshold value pattern, but it is preferable to use a three pixel-by-three pixel threshold value pattern in order to obtain higher resolution of the image while maintaining the same gray-scale value.

Figure 4:
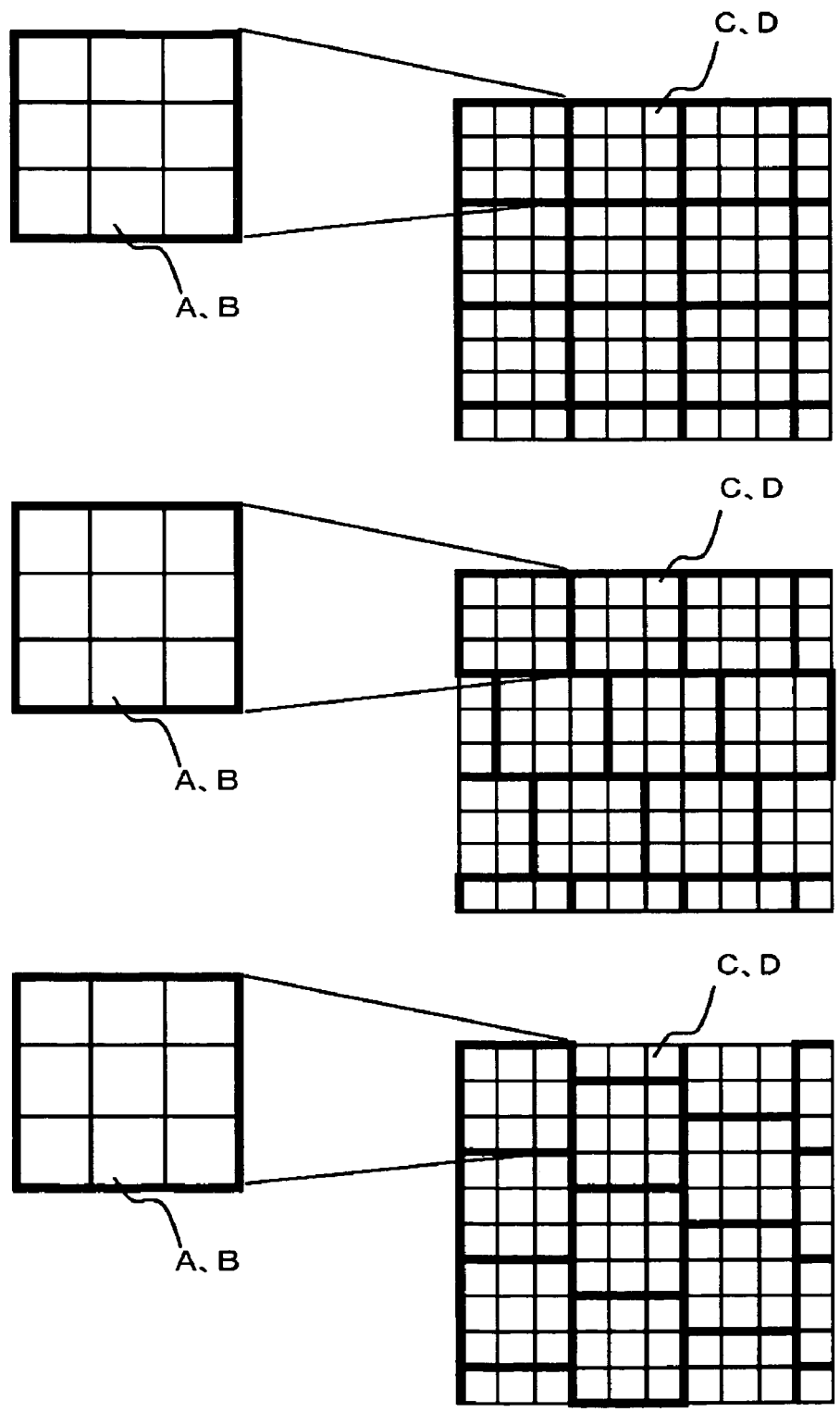
FIG. 4 is a diagram illustrating a method of arranging the patterns A and B according to the first embodiment of the present invention.

FIG. 4 shows an example of a method of arranging the threshold value patterns A and B to create filter images C and D. As shown in FIG. 4, the threshold value patterns A and B may be arranged as it is, shifting the patterns A and B in the horizontal direction, or shifting the patterns A and B in the vertical direction. In addition, when the threshold value patterns A and B are arranged to create the filter images, the arrangement method may be changed for each color. However, the threshold value patterns A and B for any color should be arranged such that one element (pixel) corresponds to another element. The filter images C and D may be in advance stored in, for example, a printer driver, or may be created by expanding unit patterns on a memory.

Figure 5:
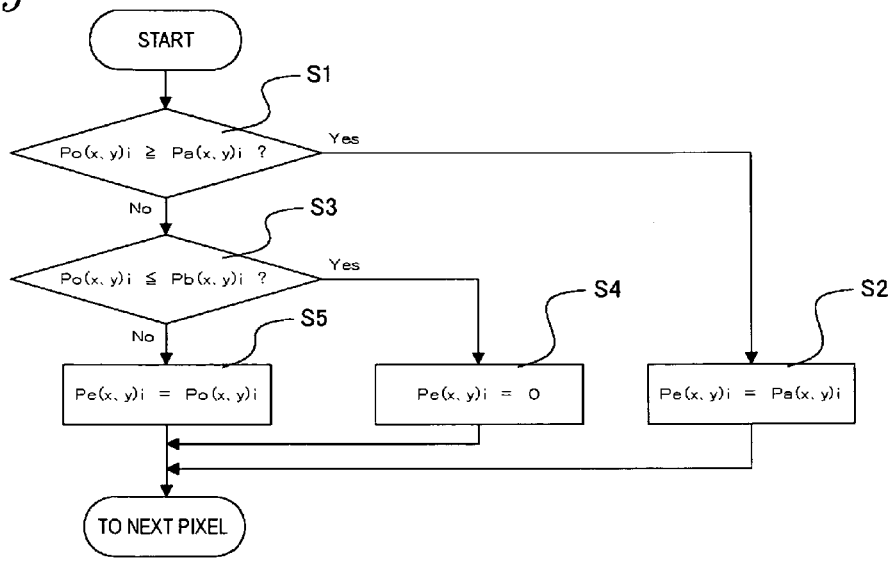
FIG. 5 is a diagram illustrating a calculating method according to the first embodiment of the present invention.

FIG. 5 shows a method of converting an image. First, an original image I is converted into a CMYK image, if necessary, and the gray-scale value of each of pixels of the original image I is compared with a coordinate value corresponding to the filter images C and D (Step S1) Assuming that the gray-scale value of any coordinates (a, b)i of the original image I is Po(a, b)i, the gray-scale values of the same coordinates of the filter images C and D are Pa(a, b)i and Pb(a, b)i, and the gray-scale value of the same coordinates after conversion is Pe(a, b)i, image conversion is performed by replacing Pe(a, b)i with Pa(a, b)i if Po(a, b)i is larger than Pa(a, b)i (Step S2), by replacing Pe(a, b)i with 0 if Po(a, b)i is smaller than Pb(a, b)i (Steps S2 and S4), and by replacing Pe(a, b)i with Po(a, b)i otherwise (Step S5).

According to the image calculation as described above, a pixel corresponding to the coordinates (a, b)p of the threshold value patterns A and B of the original image I is converted into a gray-scale having a range of from Fa(a, b)p to Fb(a, b)p. Accordingly, based on the threshold value patterns A and B shown in FIG. 3, it can be determined which dot of the threshold value patterns A and B for the gray-scale of any original image I is printed. This allows realization of area gray-scale representation by a combined pattern of dots.

Figure 6:
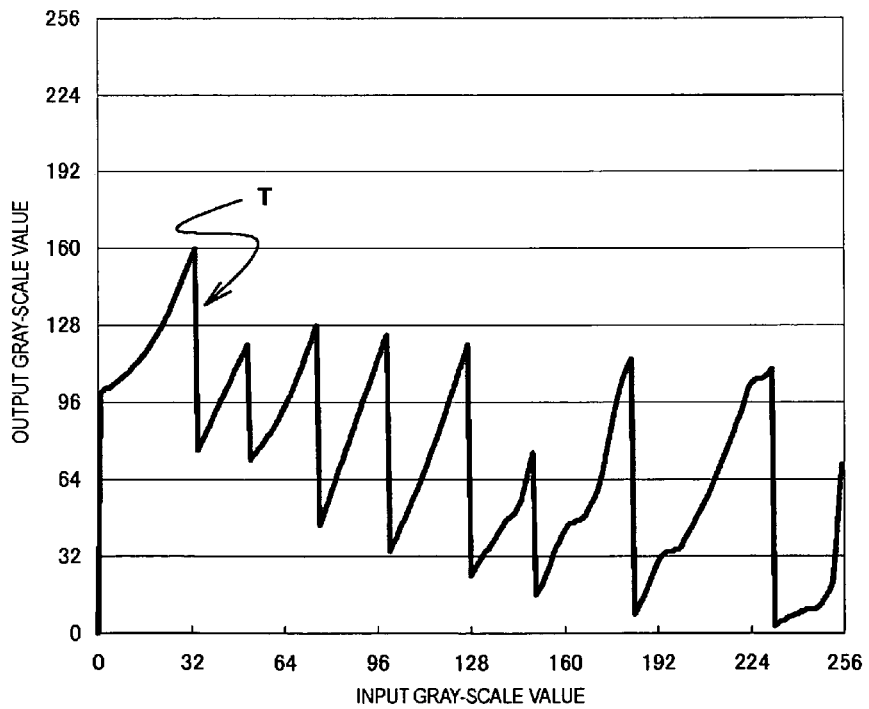
FIG. 6 is a diagram illustrating the configuration of a gray-scale conversion table according to the first embodiment of the present invention.

Next, gray-scale conversion is performed on the converted CMYK image, using a gray-scale conversion table T. FIG. 6 shows an example of the gray-scale conversion table T for one color of the CMYK image. According to the gray-scale values of the pixels after the gray-scale conversion, an application of current to the thermal head 14 is controlled, and a printing operation is performed.

Thus, by supplying energy corresponding to the gray-scale value of the original image I to the thermal head 14, for at least one pixel of the threshold value patterns A and B, a dot area gradation is realized, and a multi-gradation representation at an ordinary observation can be realized.

Although the first embodiment presupposes the CMYK printing, it should be appreciated that image conversion and printing can be performed in the same way even with a grayscale color in a printer for performing monochrome printing using, for example, a thermal paper, or with CMY or RGB colors in a printer for performing CMY printing.

In the first embodiment, in the converted image shown in FIG. 5, the number of printing dots within a pattern increases according to the gray-scale values of the original image I, and the time for applying a current to the thermal head 14 for at least one dot is changed according to the gray-scale values of the original image I.

Figure 7:
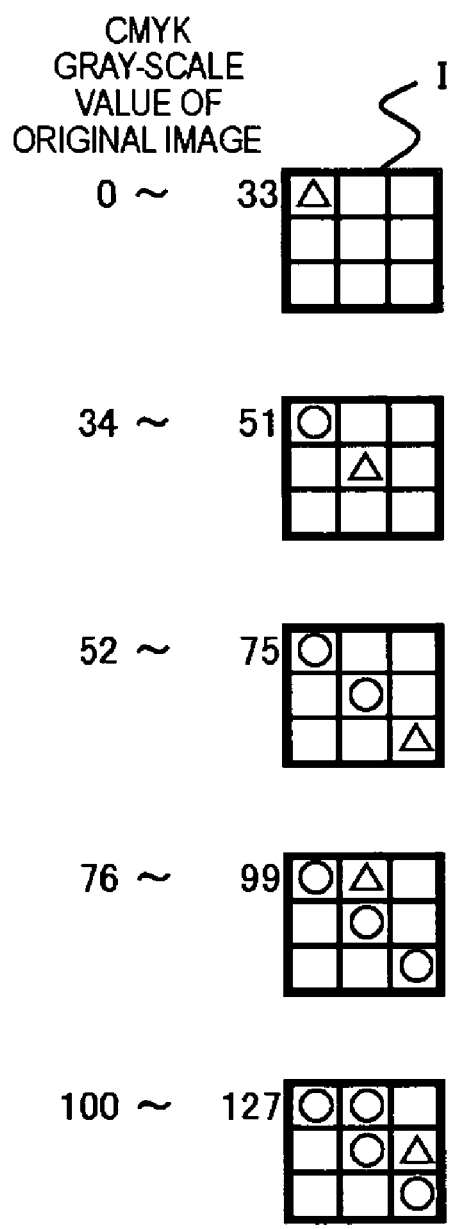
FIG. 7 is a diagram illustrating the relationship between gray-scale values of an original image and a printing dot in the pattern according to the first embodiment of the present invention.
Figure 7:
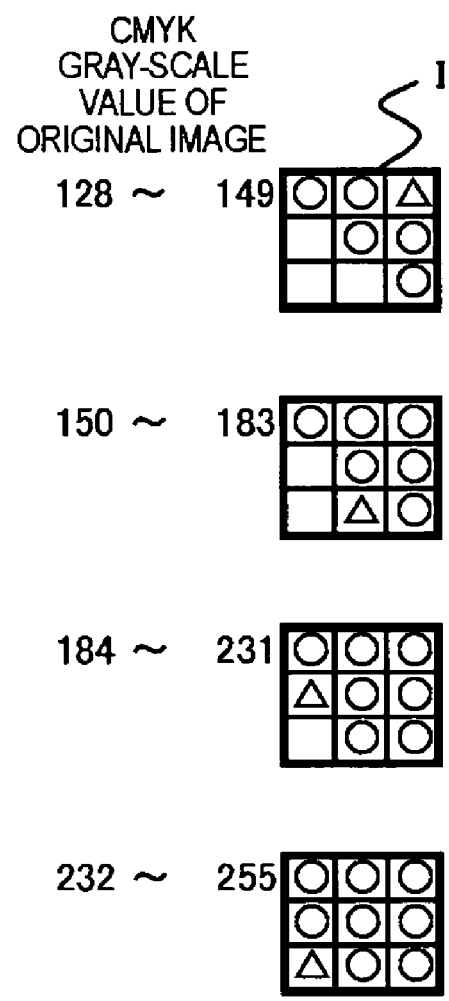

FIG. 7 shows a relationship between the gray-scale value of the original image I and a printing dot in the threshold value patterns A and B shown in FIG. 3. For example, if the gray-scale value of the original image I falls within a range of 0 to 33, only a dot at coordinates (0, 0)p is printed. As the gray-scale value of the original image I increases, that is, the color of the original image I becomes dense, the gray-scale value after the image conversion at the coordinates (0, 0)p increases. In addition, according to the gray-scale conversion table T shown in FIG. 6, the time for applying a current to the thermal head 14 increases, and hence supply energy increases, thus realizing a dot modulation. In FIG. 7, indicates a dot printed with constant energy without relying on the gray-scale value, 'r' indicates a print dot which is dot-modulated by the gray-scale value, and a blank indicates a dot not to be printed.

Similarly, if the gray-scale value of the original image I falls within a range of 34 to 51, as the gray-scale value of the original image I increases, the gray-scale value at coordinates (1, 1)p increases with the gray-scale value of a dot at coordinates (0, 0)p fixed, and the energy supplied to a dot increases according to the gray-scale conversion table T shown in FIG. 6. Similarly, as the gray-scale value of the original image I increases, the number of printing dots increases, and energy supplied to at least one dot increases according to the threshold value patterns A and B shown in FIG. 3 and the gray-scale conversion table T shown in FIG. 6.

Second Embodiment

In the first embodiment, the multi-gradation image with high resolution and high quality is stably obtained through a relatively simple method by a combination of the area gradation by the pattern and the dot area gradation. However, in a high-density region of images, a variation in printing energy of each pixels may occur in a pattern, and undesired stress may be applied to the intermediate transfer body 12 and the thermal transfer ink ribbon 18. Now, improvement of the image forming apparatus 46 to overcome this problem will be described by way of example.

Figure 8:
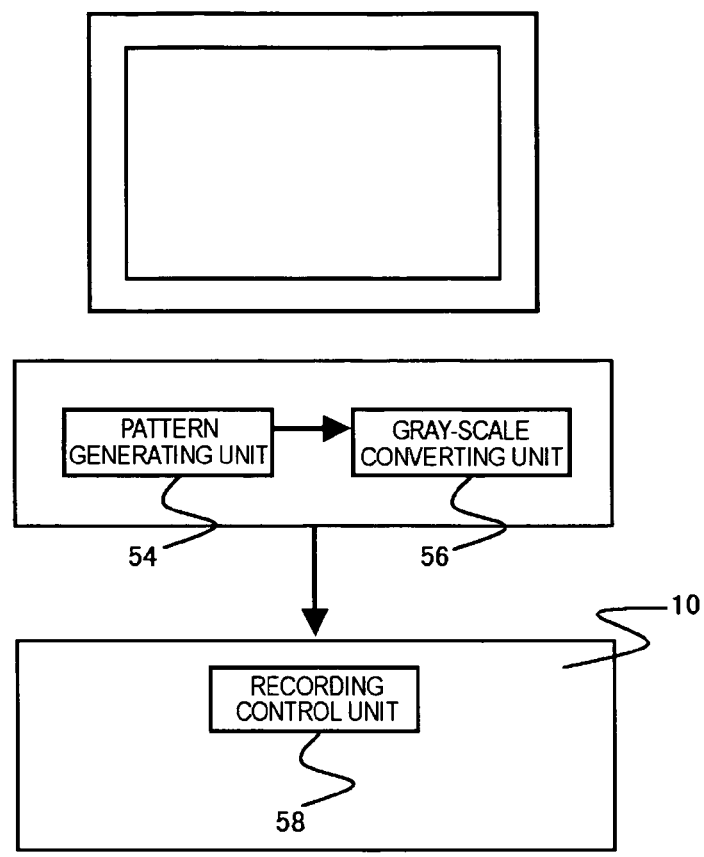
FIG. 8 is a block diagram illustrating an image forming apparatus according to a second embodiment of the present invention.

FIG. 8 is a block diagram illustrating an image forming apparatus according to a second embodiment of the present invention. As shown in FIG. 8, an image forming apparatus 46 includes a pattern generating unit 54, a gray-scale converting unit 56, and a recording control unit 58.

The pattern generating unit 54 is configured as a dividing means for dividing an original image into patterns each composed of a plurality of pixels. The gray-scale converting unit 56 is configured as a gray-scale converting unit for comparing gray-scale values of pixels of patterns divided by the pattern generating unit 54 with a gray-scale conversion table in which print energy is set to be different for the gray-scale values of pixels of patterns during printing, and for transforming the gray-scale values of pixels of each pattern. The recording control unit 58 is configured as a current application control means for controlling the application of a current to the thermal head 14 based on the gray-scale values of pixels of the original image converted by the gray-scale converting unit 56.

Figure 9:
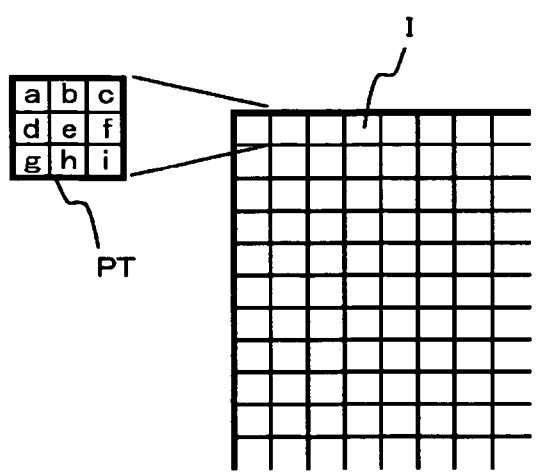
FIG. 9 is a diagram illustrating patterns according to the second embodiment of the present invention.
Figure 10:
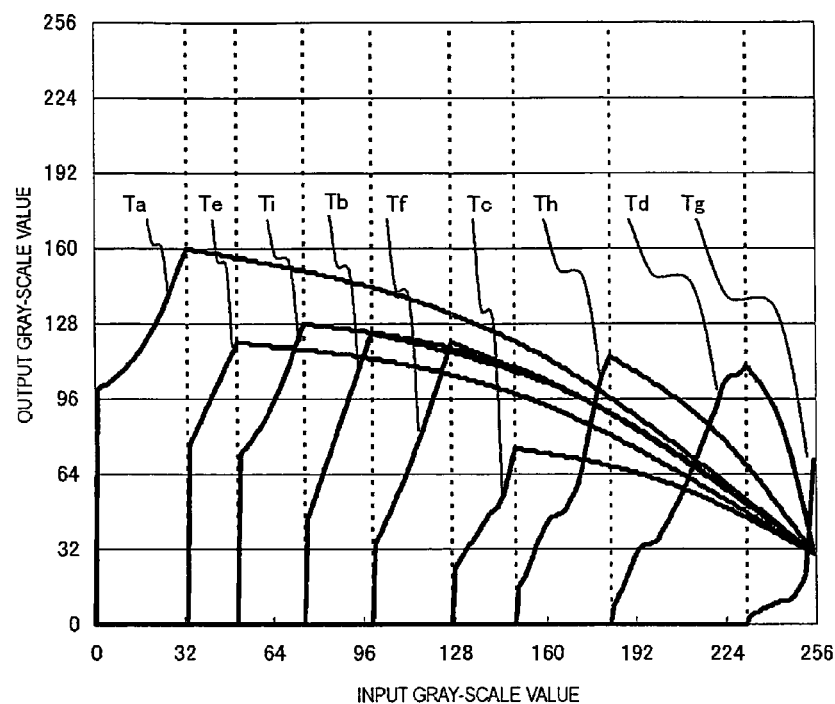
FIG. 10 is a diagram illustrating a gray-scale conversion table according to the second embodiment of the present invention.

FIG. 9 shows an example of a pattern PT for one of CMYK colors, and FIG. 10 shows an example of gray-scale conversion tables Ta to Ti of elements a to i of the pattern PT. The size of the pattern PT should be determined according to the print resolution of a printer and print stability of a combination of the printer, the ink ribbon 18, and the intermediate transfer body 12, and is in the order of two pixels by two pixels to eight pixels by eight pixels approximately. In the pattern PT, the number of vertical pixels may be different from that of horizontal pixels, or the size of the pattern PT may be varied for each of the CMYK colors. FIG. 9 shows the pattern PT having three pixels by three pixels. In addition, the gray-scale conversion tables Ta to Ti should prepared by the sum of numbers of elements of patterns for colors.

Hereinafter, a method of converting an image will be described. First, an original image I is converted into a CMYK image. The converting method may be either an LUT method or a calculation converting method.

Next, as shown in FIG. 9, the original image I is divided into a plurality of patterns PT. The patterns PT may be arranged as they are, shifting the patterns PT in the horizontal direction, or shifting the patterns PT in the vertical direction, or may be arranged to be different for each color in the same way as the creation method of the filter images C and D in the first embodiment.

Next, gray-scale conversion is performed on the gray-scale value of each pixel of the original image I, on the basis of the gray-scale conversion tables Ta to Ti prepared for the elements a to i of the patterns PT as shown in FIG. 10. For example, the gray-scale conversion table Ta is used for a pixel having coordinates corresponding to the element a of the pattern PT, and the gray-scale conversion table Ti is used for a pixel having coordinates corresponding to the element i of the pattern PT. According to an image obtained by this conversion, the application of a current to the thermal head 14 is controlled, and an image is formed on the intermediate transfer medium.

In the second embodiment, by adjusting the pattern PT shown in FIG. 9 and the gray-scale conversion tables Ta to Ti shown in FIG. 10, it is possible to adjust energy corresponding to the gray-scale value, and to suppress a variation in energy in the pattern PT in the high-density region of images. Thus, it is possible to overcome the problem of the first embodiment, and to achieve simple patterning and gray-scale conversion, resulting in high-speed image processing.

Third Embodiment

In addition, in the first and second embodiments, by combining variations of feed resolution of each of Y, M, C and K, for example, resolution which may be slightly lowered by the patterning can be improved, and color irregularity due to a deviation of color registration in the sub-scanning direction can be prevented.

Figure 11:
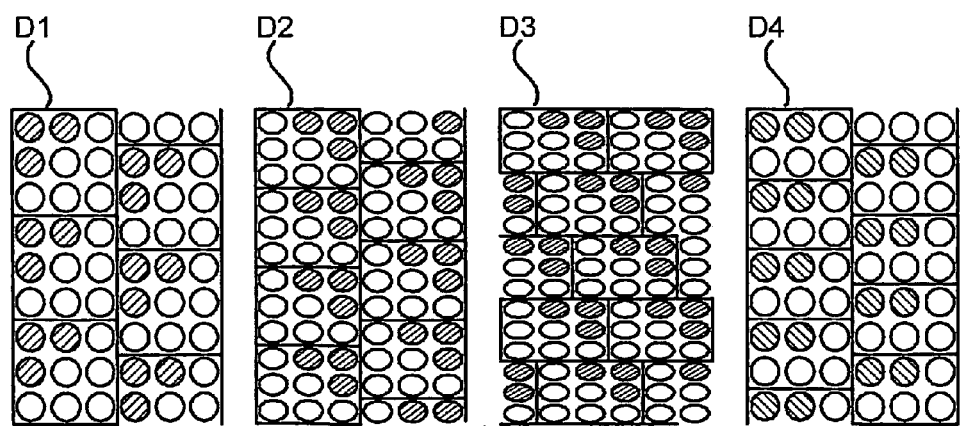
FIG. 11 is a diagram illustrating an example of each color pattern according to a third embodiment of the present invention.
Figure 12:
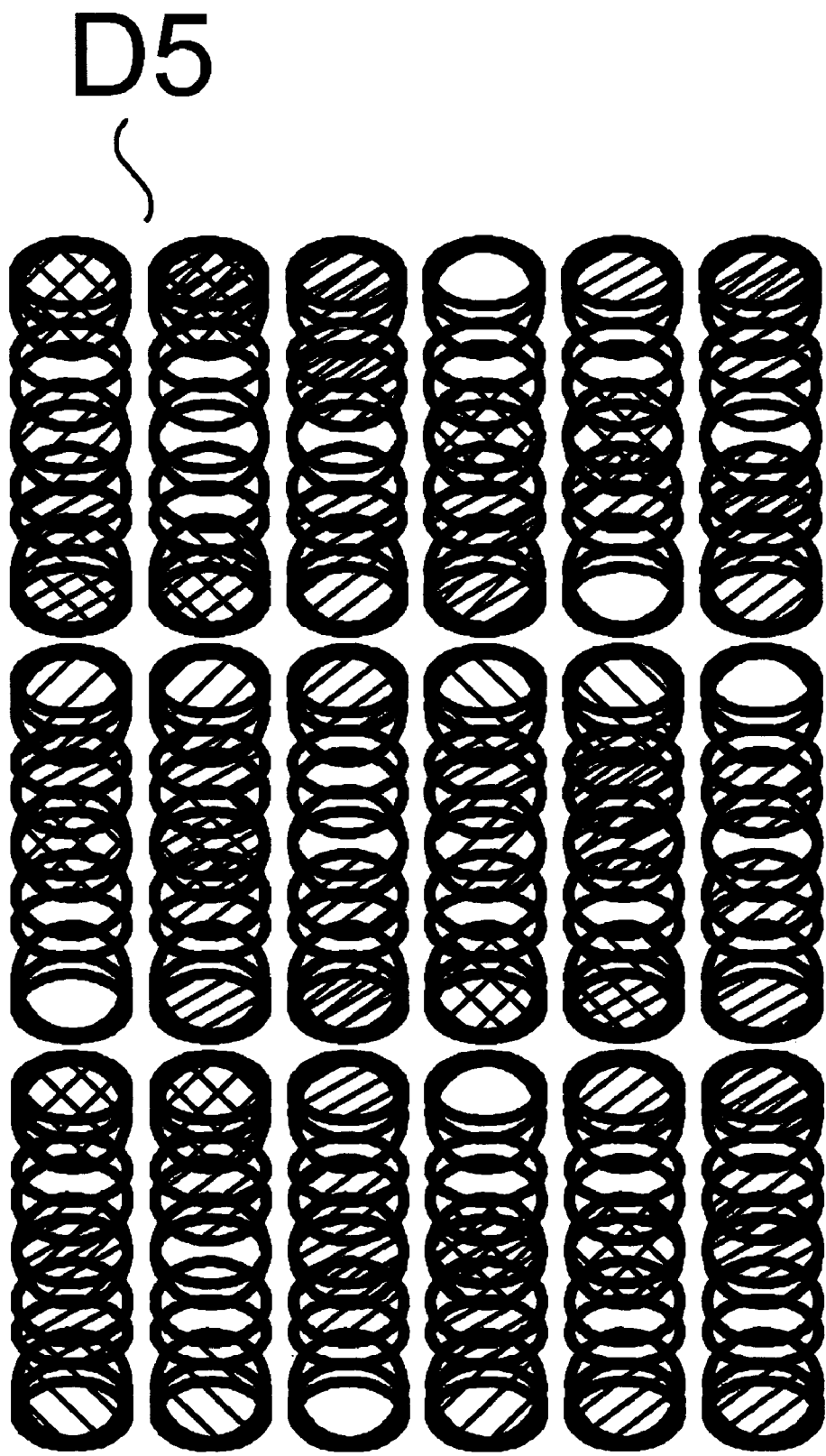
FIG. 12 is a diagram illustrating an example of a dot pattern of an image formed according to the third embodiment of the present invention.

FIG. 11 shows an example of the arrangement of color patterns indicated on FIG. 11 when a four-color ribbon is used. FIG. 12 shows a dot pattern of an image formed by overlapping the color patterns. In the first and second embodiments, the original image is divided into CMYK colors, and resolution in the feed direction for a specific color image or all color images is converted. Thereafter, patterning and gray-scale conversion is performed on each color. Then, according to the gray-scale values of pixels after the gray-scale conversion, the application of a current to the thermal head 14 is controlled, and printing is performed. Since the resolution of Y at an ordinary observation is difficult to be perceived, it is preferable to vary the resolution of M and C. As shown in FIG. 11, D1 and D4 have the resolution of the original image, D2 has 4/3 times the resolution of the original image, and D3 has 5/3 times the resolution of the original image.

In this manner, by varying the feed resolution of each color, an overlap of dots is changed in a period by the length of a common multiple of feed pitches, and fine color irregularities occur. However, if a period of the color irregularities is sufficiently small, the color irregularities cannot be perceived by ordinary observation. As a whole, since deviation of dots occurs in advance with a period, deviation of fine dots occurring between colors cannot be perceived. As a result, the color irregularities are not perceived by ordinary observation.

In addition, if patterns for each colors have the same arrangement, there appears a period of the length of the product of a common multiple of feed pitches and the size of the pattern in the feed direction, and stripes in the horizontal direction is perceived by ordinary observation. However, by varying the arrangement of the patterns shown in the first and second embodiments for each color, it is possible to avoid such a phenomenon.

Further, in the first and second embodiments, although the resolution at an ordinary observation is lowered due to the size of the pattern, by increasing the feed resolution, there appears an effect of reducing the size of the pattern, thus enabling the improvement of the resolution.

In the first and second embodiments, when printing is performed on a low-density region of images, only some dots of the pattern PT are printed. Therefore, the density becomes lowed even if large energy is applied to form dots. That is, it is possible to apparently lower the density using an energy zone in which dots can be stably formed. According to the method of the present invention, it is possible to obtain a gray-scale value having sufficient density using the energy zone in which dots can be stably formed. Accordingly, it is possible to stably form images with high quality.

The second embodiment is similar to the first embodiment in that, when the printing is performed on the low density region of images, since only some dots of the pattern PT are printed, the density becomes lowered even if large energy is applied to form dots. In addition, when the printing is performed on a high-density region of images, it is possible to adjust the energy used to form the dots in the gray-scale conversion tables Ta to Ti shown in FIG. 9. Therefore, by applying required minimal energy to the dots, it is possible to suppress thermal stress applied to the ink ribbon 18, the intermediate transfer body 12, and the like to a minimum, and to suppress troubles, such as print creases, to a minimum.

According to the third embodiment, it is possible to reduce the color irregularities due to the slight deviation of dots between colors, and to solve the lowering of the resolution due to the patterning.

In addition, the first to third embodiments can be applied to white, red, blue, and green ink ribbons, special color ribbons, deposition silver ribbons for bonding and transferring metal deposition films and the like, print silver ribbons, and combinations thereof, as well as the Y, M, C and K ink ribbons.

As described above, according to the present invention, by combining the area gradation representation by the pattern with the dot area gradation representation, it is possible to stably form images with high resolution and high quality. In the above embodiments, it is possible to stably print images with high quality in an intermediate transfer type thermal printer provided with a thermal head having a resolution of 400 dpi. Of course, the present invention is applicable to all printing methods using general thermal heads as well as the intermediate transfer type thermal printer.

As described above, according to the invention, images can be stably formed on a medium to be recorded by the thermal printer using the thermal transfer ink, and the multi-gradation images can be formed with high resolution and high quality.

What is claimed is:

1. A method of forming an image by thermally transferring thermal transfer ink of a thermal transfer ink ribbon onto a medium to be recorded by a thermal head, the method comprising the steps of:

comparing gray-scale values of pixels of a filter image having a threshold value pattern used to determine whether each of a plurality of pixels of an original image is an object to be printed, based on gray-scale values of the plurality of pixels, with the gray-scale values of the pixels of the original image to convert the gray-scale values of the pixels of the original image on the basis of the result of the comparison;

comparing a gray-scale conversion table in which energy applied to each pixel at the time of printing is prescribed corresponding to the gray-scale value of the pixel with the converted gray-scale values of the pixels of the original image to further convert the gray-scale values of the pixels of the original image on the basis of the result of the comparison; and controlling the application of a current to the thermal head depending on the converted gray-scale values of the pixels of the original image, wherein, when color separation is performed on the original image, a feed resolution of the separated original image is converted, and feed resolutions of at least magenta and cyan are different from each other.

2. A method of forming an image by thermally transferring thermal transfer ink of a thermal transfer ink ribbon onto a medium to be recorded by a thermal head, the method comprising the steps of:

dividing an original image into patterns each composed of a plurality of pixels;

comparing gray-scale values of the pixels of the divided patterns with a gray-scale conversion table in which energy applied to the pixels of each pattern at the time of printing is set to be different, corresponding to the gray-scale values of the pixels, to convert the gray-scale values of the pixels of each pattern on the basis of the result of the comparison; and controlling the application of a current to the thermal head based on the converted gray-scale values of pixels of the original image, wherein, when color separation is performed on the original image, a feed resolution of the separated original image is converted, and feed resolutions of at least magenta and cyan are different from each other.

3. An image forming method used for a thermal printer including an image forming device that forms images by thermally transferring thermal transfer ink of a thermal transfer ink ribbon onto a medium to be recorded by a thermal head, wherein the image forming device performs the steps of:

comparing gray-scale values of pixels of a filter image having a threshold value pattern used to determine whether each of a plurality of pixels of an original image is an object to be printed, based on gray-scale values of the plurality of pixels, with the gray-scale values of the pixels of the original image to convert the gray-scale values of the pixels of the original image on the basis of the result of the comparison;

comparing a gray-scale conversion table in which energy applied to the pixels at the time of printing is prescribed corresponding to the gray-scale values of the pixels with the converted gray-scale values of the pixels of the original image to further convert the gray-scale values of the pixels of the original image on the basis of the result of the comparison; and controlling the application of a current to the thermal head depending on the converted gray-scale values of the pixels of the original image, wherein, when color separation is performed on the original image, a feed resolution of the separated original image is converted, and feed resolutions of at least magenta and cyan are different from each other.

4. An image forming method used for a thermal printer including an image forming device that forms images by thermally transferring thermal transfer ink of a thermal transfer ink ribbon onto a medium to be recorded by a thermal head, wherein the image forming device performs the steps of:

dividing an original image into patterns each composed of a plurality of pixels;

comparing gray-scale values of the pixels of the divided patterns with a gray-scale conversion table in which energy applied to the pixels of each pattern at the time of printing is set to be different, corresponding to the gray-scale values of the pixels, to convert the gray-scale values of the pixels of each pattern on the basis of the result of the comparison; and controlling the application of a current to the thermal head based on the converted gray-scale values of pixels of the original image, wherein, when color separation is performed on the original image, a feed resolution of the separated original image is converted, and feed resolutions of at least magenta and cyan are different from each other.

5. An image forming apparatus that thermally transfers thermal transfer ink of a thermal transfer ink ribbon onto a medium to be recorded by a thermal head, comprising:

an image processing unit that compares gray-scale values of pixels of a filter image having a threshold value pattern used to determine whether each of a plurality of pixels of an original image is an object to be printed, based on gray-scale values of the plurality of pixels, with the gray-scale values of the pixels of the original image to convert the gray-scale values of the pixels of the original image on the basis of the result of the comparison;

a gray-scale converting unit that compares a gray-scale conversion table in which energy applied to each pixel at the time of printing is prescribed corresponding to the gray-scale value of the pixel with the gray-scale values of the pixels of the original image converted by the image processing unit to further convert the gray-scale values of the pixels of the original image on the basis of the result of the comparison; and a current application control unit that controls the application of a current to the thermal head depending on the gray-scale values of the pixels of the original image converted by the gray-scale converting unit, wherein, when color separation is performed on the original image, a feed resolution of the separated original image is converted, and feed resolutions of at least magenta and cyan are different from each other.

6. An image forming apparatus that thermally transfers thermal transfer ink of a thermal transfer ink ribbon onto a medium to be recorded by a thermal head, comprising:

a dividing unit that divides an original image into patterns each composed of a plurality of pixels;

a gray-scale converting unit that compares gray-scale values of the pixels of the patterns divided by the dividing unit with a gray-scale conversion table in which energy applied to the pixels of each pattern at the time of printing is set to be different, corresponding to the gray-scale values of the pixels, to convert the gray-scale values of the pixels of each pattern on the basis of the result of the comparison; and a current application control unit that controls the application of a current to the thermal head based on the converted gray-scale values of pixels of the original image converted by the gray-scale converting unit, wherein, when color separation is performed on the original image, a feed resolution of the separated original image is converted, and feed resolutions of at least magenta and cyan are different from each other.

* * * * *